United States Patent
He et al.

(10) Patent No.: US 11,805,581 B2
(45) Date of Patent: Oct. 31, 2023

(54) BUFFER CIRCUIT FOR LIGHT EMITTING DIODE (LED) DRIVE CIRCUIT, AND LED DRIVE CIRCUIT AND CONTROL METHOD THEREOF

(71) Applicant: Joulwatt Technology Co., Ltd., Hangzhou (CN)

(72) Inventors: Wanyue He, Hangzhou (CN); Guoqiang Liu, Hangzhou (CN)

(73) Assignee: JOULWATT TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/953,113

(22) Filed: Sep. 26, 2022

(65) Prior Publication Data

US 2023/0098482 A1   Mar. 30, 2023

(30) Foreign Application Priority Data

Sep. 26, 2021   (CN) .......................... 202111127852.3

(51) Int. Cl.
*H05B 45/10* (2020.01)
*H05B 45/327* (2020.01)
*H05B 45/3725* (2020.01)

(52) U.S. Cl.
CPC .......... *H05B 45/10* (2020.01); *H05B 45/327* (2020.01); *H05B 45/3725* (2020.01)

(58) Field of Classification Search
CPC .. H05B 45/10; H05B 45/327; H05B 45/3725; H05B 45/31; H05B 45/36; Y02B 20/30
See application file for complete search history.

(56) References Cited

U.S. PATENT DOCUMENTS

| | | | |
|---|---|---|---|
| 2018/0115234 A1* | 4/2018 | Liu | H05B 45/3575 |
| 2018/0139816 A1* | 5/2018 | Liu | H05B 45/3575 |
| 2018/0241195 A1* | 8/2018 | Zhang | H05B 6/00 |
| 2021/0092816 A1* | 3/2021 | Yang | H05B 45/36 |

* cited by examiner

*Primary Examiner* — Minh D A
(74) *Attorney, Agent, or Firm* — Bayramoglu Law Offices LLC

(57) ABSTRACT

A buffer circuit for an LED driver circuit, a LED driver circuit, and a control method, the buffer circuit includes a first control switch connected in series in a rectified input loop and a feedback control module connected to the rectified input loop to obtain a loop current in the rectified input loop for generating a first control signal to the first control switch according to the loop current and a reference signal. The first control switch switches between a fully conducting state and a non-fully-conducting state based on the first control signal and restrains the loop current when the first control switch is in the non-fully-conducting state. The buffer circuit enhances the effect of restraining the current change rate and can effectively restrain current spikes in a circuit, resulting in higher safety and reliability.

17 Claims, 5 Drawing Sheets

BUFFER CIRCUIT FOR LIGHT EMITTING DIODE (LED) DRIVE CIRCUIT, AND LED DRIVE CIRCUIT AND CONTROL METHOD THEREOF

CROSS REFERENCE TO THE RELATED APPLICATION

The application claims priority to Chinese patent application No. 202111127852.3 filed on Sep. 26, 2021, the entire content of which is incorporated herein by reference.

TECHNICAL FIELD

The present invention relates to the technical field of power electronics, in particular, to a buffer circuit for an LED driver circuit, an LED driver circuit, and a control method thereof.

BACKGROUND

At present, the LED lighting industry is developing rapidly, and the market's pursuit of energy-saving benefits has led to increasing demand for LED dimming. Phase-cut dimming is one of the commonly used dimming methods. For example, conventional phase-cut dimming uses a Triac dimmer to input voltage chopping starting from a zero phase of an alternating current, and perform voltage input after the Triac is turned on. The conduction angle of each half-wave of the alternating current is adjusted to change the sinusoidal waveform, thereby changing the effective value of the alternating current to achieve the purpose of dimming.

An existing LED driver circuit is shown in FIG. 1. When the Triac is turned on, the input terminal voltage will present a large voltage change rate (dv/dt), resulting in a large inrush current at the input terminal. This inrush current has a high amplitude and a short duration, which is easy to cause a false shutdown of the Triac, affects the stable operation of the LED driver circuit, and causes the LED lights to flicker. Therefore, to reduce the peak value of the inrush current and reduce the current change rate (di/dt) when the input current drops, a buffer circuit 30 needs to be connected in series after the rectifier bridge.

As shown in FIG. 1, most of the existing buffer circuits 30 connect the buffer resistor R1 and the first control switch Q1 in parallel and connect them to the input loop rectified by the rectifier bridge 20. The control signal of the first control switch Q1 and the timing waveform of the loop current $I_{in}$ in the input loop are shown in FIG. 2. It can be seen from FIG. 2 that the existing buffer circuit structure is less effective in restraining the current change rate of the circuit, and the loop current $I_{in}$ in the circuit has a relatively large current peak and longer current oscillation when the first control switch Q1 is switched from the off state to the on state, which is easy to cause dimming noise. Moreover, the buffer resistor R1 is also easily damaged when the circuit operates abnormally.

Therefore, it is necessary to provide an improved technical solution to overcome the above technical problems existing in the prior art.

SUMMARY

To solve the above technical problems, the present invention provides a buffer circuit for an LED driver circuit, an LED driver circuit, and a control method thereof. The present invention enhances the effect of restraining the current change rate and can effectively restrain current spikes in a circuit, which results in higher security and reliability.

According to a first aspect of the present invention, a buffer circuit for an LED driver circuit is provided, including a first control switch connected in series in a rectified input loop and a feedback control module connected to the rectified input loop to obtain a loop current in the rectified input loop for generating a first control signal to the first control switch according to the loop current and a reference signal. The first control switch switches between a fully conducting state and a non-fully-conducting state based on the first control signal and restrains the loop current when the first control switch is in the non-fully-conducting state.

Optionally, the first control switch operates in the fully conducting state when the difference between the reference signal and a sampled signal obtained from the loop current is greater than a first threshold, and the first control switch operates in the non-fully-conducting state when the difference between the reference signal and the sampled signal obtained from the loop current is smaller than the first threshold.

Optionally, the feedback control module includes a sampling resistor connected in series with the first control switch in the rectified input loop; an operational amplifier, which has an inverting input terminal connected to a common connection point of the sampling resistor and the first control switch to sample the loop current, a non-inverting input terminal for receiving the reference signal, and an output terminal connected to a control end of the first control switch to output the first control signal; and a reference signal generating unit connected to the inverting input terminal of the operational amplifier for providing the reference signal.

Optionally, the feedback control module further includes a voltage detection unit connected to the rectified input loop to acquire an input voltage in the rectified input loop for generating a second control signal according to the input voltage and a second threshold. The second control signal is configured for adjusting the voltage value of the reference signal provided by the reference signal generating unit.

Optionally, when the input voltage of the rectified input loop is smaller than the second threshold, the reference signal generating unit provides the reference signal having a first voltage value based on the second control signal. When the input voltage of the rectified input loop is greater than the second threshold, the reference signal generating unit provides the reference signal having a second voltage value based on the second control signal. In such cases, the first voltage value is smaller than the second voltage value.

Optionally, before obtaining the loop current, the feedback control module is further configured to obtain a reference voltage and generate a third control signal to the first control switch based on the reference voltage and the reference signal. In such cases, the reference voltage is greater than the first voltage value, and the first control switch is in a completely off state after receiving the third control signal.

Optionally, the feedback control module further includes a selection unit connected to the voltage detection unit to receive the second control signal. The selection unit is configured to control the inverting input terminal of the operational amplifier to receive one of the reference voltage or the loop current according to the second control.

Optionally, when the input voltage of the rectified input loop is less than the second threshold, the inverting input terminal of the operational amplifier receives the reference voltage. When the input voltage of the rectified input loop is greater than the second threshold, the inverting input terminal of the operational amplifier receives the loop current.

Optionally, the selection unit includes a selection switch, which has a first input terminal for receiving the reference voltage, a second input terminal for receiving the loop current, an output terminal connected to the inverting input terminal of the operational amplifier, and a control terminal for receiving the second control signal. The selection switch selects one of the first input terminal or the second input terminal to communicate with the output terminal according to the second control signal.

Optionally, the voltage detection unit includes a sampling unit connected to the rectified input loop for sampling the input voltage; a comparator, which has an inverting input terminal connected to the sampling unit to receive a sampled input voltage, a non-inverting input terminal for receiving a second threshold voltage, and an output terminal of the comparator that outputs the second control signal.

Optionally, the reference signal generating unit includes a base reference signal generating unit configured to generate a first base reference signal according to a first current source, a first voltage adjustment unit configured to adjust the first base reference signal to the first voltage value when the second control signal is in a first level state, and a second voltage adjustment unit configured to adjust the first base reference signal to the second voltage value when the second control signal is in a second level state.

Optionally, the base reference signal generating unit includes the first current source for providing a first charging current and a first capacitor connected to the first current source for generating a first base reference voltage at a first node according to the first charging current. The first node is a common connection point between the first current source and the first capacitor.

Optionally, the first voltage adjustment unit includes a second control switch, which includes a drain connected to the first node and a gate for receiving the second control signal, and a first voltage source, which includes a positive voltage terminal connected to a source of the second control switch and a negative voltage terminal connected to a reference ground.

Optionally, the second voltage adjustment unit includes a first diode, which includes an anode connected to the first node, and a second voltage source, which includes a positive voltage terminal connected to a cathode of the first diode and a negative voltage terminal connected to the reference ground.

Optionally, the second voltage adjustment unit includes a second diode, which includes an anode connected to the first node and a cathode connected to a second node; a second current source for providing a second charging current; a second capacitor connected to the second current source and configured to generate a second base reference voltage at the second node according to the second charging current in which a common connection point of the second current source and the second capacitor is connected to the second node; a third control switch, which includes a drain connected to the second node and a gate receiving the second control signal; a third voltage source, which includes a positive voltage terminal connected to a source of the third control switch and a negative voltage terminal connected to the reference ground; and a Zener diode, which includes a cathode connected to the second node and an anode connected to the reference ground.

According to a second aspect of the present invention, an LED driver circuit is provided, including a Triac dimmer, a rectifier circuit, a filter circuit, and an LED driver. The rectifier circuit, the filter circuit, and the LED driver are connected in parallel to form an input loop, and the Triac dimmer is connected in series in an input terminal of the input loop. The LED driver circuit further includes the above-mentioned buffer circuit for the LED driver circuit in which the buffer circuit is connected in series in the input loop.

According to a third aspect of the present invention, a method for controlling an LED driver circuit is provided including setting a first control switch in a rectified input loop, sampling and acquiring a loop current in the rectified input loop, and controlling the first control switch to switch between a fully conducting state and a non-fully-conducting state based on the loop current and a reference signal. When it is detected that the difference between the reference signal and a sampled signal obtained from the loop current is smaller than a first threshold, the first control switch operates in the non-fully-conducting state to restrain the loop current.

Optionally, the control method further includes: Before the first control switch is controlled to operate in the non-fully-conducting state, the first control switch is in a fully-off state.

Optionally, the control method further includes obtaining an input voltage in the rectified input loop, adjusting a voltage value of the reference signal according to the input voltage and a second threshold, adjusting the reference signal to a first voltage value when the input voltage is less than the second threshold, and adjusting the reference signal to a second voltage value when the input voltage is greater than the second threshold. The first voltage value is smaller than the second voltage value.

The beneficial effects of the present invention are as follows. In the buffer circuit for the LED driver circuit provided by the present invention (hereinafter referred to as the buffer circuit), a control switch is connected in series with the rectified input loop, and the feedback control module is configured to provide a control signal to control the control switch connected in series with the input loop to switch between the fully conducting state and the non-fully-conducting state based on a loop current obtained by sampling the input loop and a reference signal. Therefore, the buffer circuit can buffer the current spikes generated in the input loop when the Triac dimmer is turned on by means of the resistance characteristics of the control switch in the non-fully-conducting state, resulting in the loop current being restrained. The present invention introduces the buffer circuit into the current loop to realize the closed-loop control of the loop current in the input loop, which enhances the buffer performance. Further, the buffer circuit provided by the present invention has a simple circuit structure and only uses the resistance characteristics of the control switch in the non-fully-conducting state to achieve the buffering function without setting a buffer resistor, which avoids the risk of a buffer resistor being easily damaged when the circuit operates abnormally, thereby having enhanced safety and reliability. Furthermore, the feedback control module is based on a voltage value of the reference signal that changes with the different operating states of the circuit, which helps to ensure that the control switch in the input loop can be in the fully conducting state when the loop current is normal and partially conducting state when the loop current spike occurs to effectively restrain the current spike in the loop, which enhances the restraint effect of the current change rate (di/dt) in the loop current.

It should be understood that the foregoing general description and the following detailed description are exemplary and explanatory only and are not intended to limit the present invention.

DETAILED DESCRIPTION OF THE EMBODIMENTS

To facilitate understanding of the present invention, the present invention will be described fully hereinafter by referring to the related drawings. Preferred embodiments of the present invention are shown in the accompanying drawings. However, the present invention may be embodied in different forms and is not limited to the embodiments described herein. Rather, these embodiments are provided for a thorough and complete explanation of the present disclosure.

Figure 1:
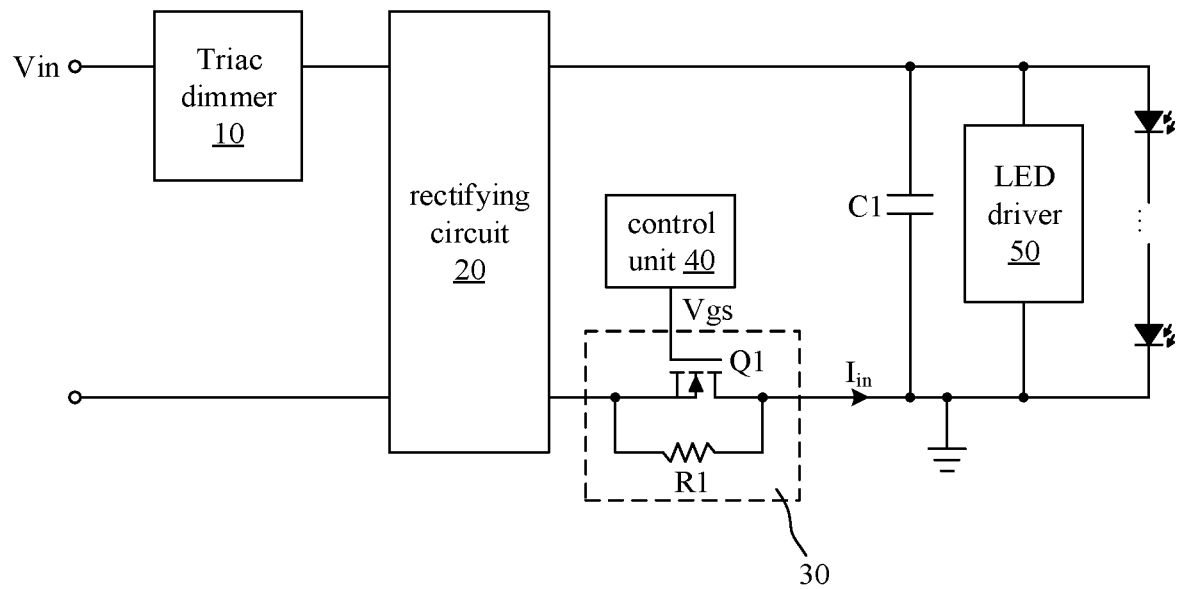
FIG. 1 shows a schematic structural diagram of an existing LED driver circuit.
Figure 2:
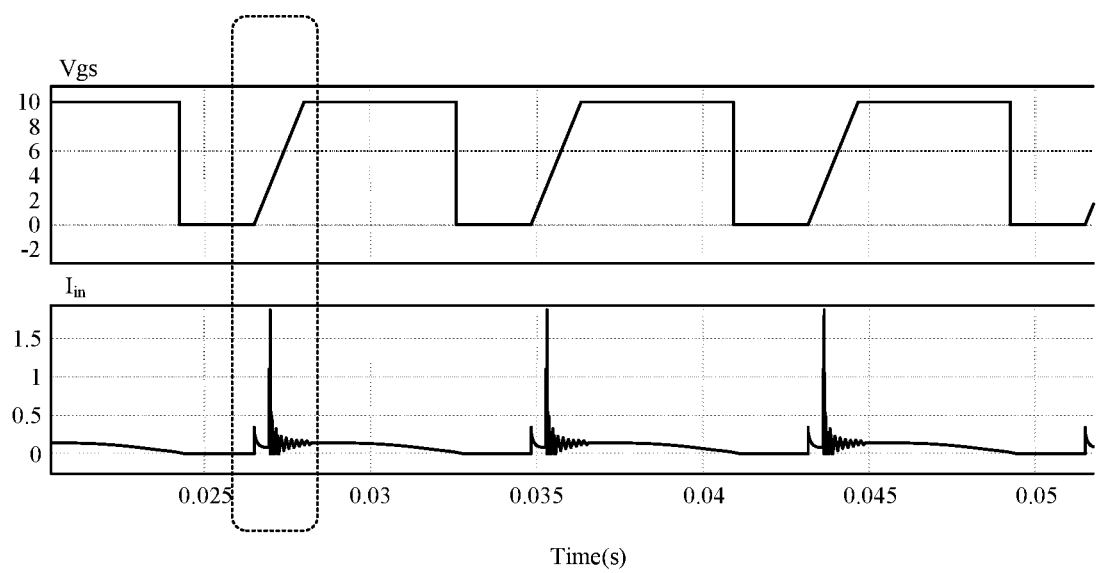
FIG. 2 shows a schematic diagram of timing waveforms of some signals in an existing LED driver circuit.
Figure 3:
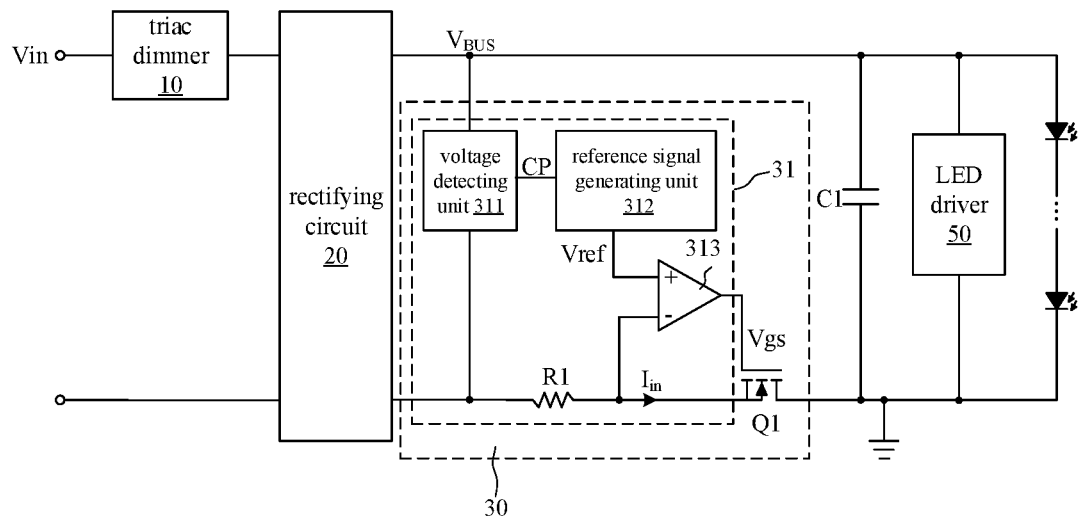
FIG. 3 shows a schematic structural diagram of an LED driver circuit provided according to an embodiment of the present invention.

Referring to FIG. 3, the present invention provides an LED driver circuit including a Triac dimmer 10, a rectifier circuit 20, a buffer circuit 30, a filter circuit, an LED driver 50, and an LED light string.

The Triac dimmer 10 is connected in series with the input end of the rectifier circuit 20, and the rectifier circuit 20 is sequentially connected in parallel with the capacitor C1, the LED driver 50, and the LED lamp string to form an input loop.

The Triac dimmer 10 is used to realize the front-phase-cut or back-phase-cut chopping of the alternating current. It should be noted that this embodiment is described by taking the front-phase-cut chopping of the alternating current as an example, but the technical solutions disclosed in the present invention are also applicable to the example of the back-phase-cut chopping of the alternating current.

The rectifier circuit 20 is used to rectify the chopped alternating current into the direct current. In this embodiment, the rectifier circuit 20 is, for example, a full-bridge rectifier circuit.

The filter circuit includes, for example, a filter capacitor C1 for filtering the input signal that is input to the LED driver 50.

The LED driver 50 is used for providing a driving signal for driving the LED lamp according to the filtered input signal.

The buffer circuit 30 is arranged in the input loop behind the rectifier circuit 20 and is used for buffering the current in the input loop to reduce the current peak and oscillation of the loop current in the input loop and restrain the current spike.

In this embodiment, the buffer circuit 30 specifically includes a first control switch Q1 and a feedback control module 31.

The first control switch Q1 is connected in series in the rectified input loop. For example, the first control switch Q1 is a field effect transistor or a triode, and in this embodiment, the first control switch Q1 only operates in a non-fully-conducting state or a fully-conducting state.

The feedback control module 31 is connected to the rectified input loop to obtain the loop current (denoted as $I_{in}$) in the rectified input loop and is used to generate a first control signal (denoted as $V_{gs}$) to be received by the first control switch Q1 according to the loop current $I_{in}$ and the reference signal (denoted as $V_{ref}$). The first control switch Q1 is switched between a fully conducting state and a non-fully-conducting state based on the first control signal $V_{gs}$. Based on the working principle of the first control switch Q1, it can be known that when the first control switch Q1 operates in a fully-conducting state, the first control switch Q1 is fully conducting so that the driver circuit can work normally. When the first control switch Q1 operates in a non-fully-conducting state, the first control switch Q1 is only partially conducting, and at this time, the resistance characteristic of the first control switch Q1 in the non-fully-conducting can be used to implement a buffer function to restrain the loop current $I_{in}$. Since the present invention does not set the buffer resistor in the buffer circuit, it can avoid the risk of easily damaging a buffer resistor when the driver circuit operates abnormally, thereby enhancing safety and reliability and simplifying the circuit structure.

The feedback control module 31 includes a sampling resistor R1, a reference signal generating unit 312, and an operational amplifier 313.

The sampling resistor R1 and the first control switch Q1 are connected in series in the rectified input loop. Furthermore, the sampling circuit R1 is connected between the first control switch Q1 and the output end of the rectifier circuit 20 and is used to realize the acquisition of the loop current $I_{in}$.

The inverting input terminal of the operational amplifier 313 is connected to the common connection point of the sampling resistor R1 and the first control switch Q1 to sample the loop current $I_{in}$ to obtain a sampling signal. The non-inverting input terminal of the operational amplifier 313 receives the reference signal $V_{ref}$. The output terminal of the operational amplifier 313 is connected to the control terminal of the first control switch Q1 to output the first control signal $V_{gs}$. Exemplarily, the loop current $I_{in}$ is converted into a voltage signal after passing through the sampling resistor R1 and is sampled and obtained by the inverting input terminal of the operational amplifier 313.

The reference signal generating unit 312 is connected to the inverting input terminal of the operational amplifier 313 for providing the reference signal $V_{ref}$.

In this embodiment, the operational amplifier 313, for example, may be configured as a subtractor circuit or a differential amplifier circuit. Furthermore, there is a certain proportional relationship between the voltage value of the first control signal $V_{gs}$ output by the operational amplifier 313 and the difference between the reference signal $V_{ref}$ and the sampling signal obtained based on the loop current $I_{in}$. Based on the sampling resistor R1, the operational amplifier 313 can reflect the change of the loop current $I_{in}$ in the input loop on the voltage value of the first control signal $V_{gs}$ output by the operational amplifier 313. When the loop current $I_{in}$ generates current spikes, oscillations, or other abnormal moments, it can enable the first control signal $V_{gs}$ to have a corresponding voltage value to control the first control switch Q1 to work in a non-fully-conducting state, thereby achieving the effect of restraining the loop current $I_{in}$.

Further, when the difference between the reference signal $V_{ref}$ and the sampling signal obtained based on the loop current $I_{in}$ is greater than the first threshold, the first control switch Q1 can operate in a fully-conducting state based on the first control signal $V_g$s. When the difference between the reference signal $V_{ref}$ and the sampling signal obtained based on the loop current $I_{in}$ is smaller than the first threshold, the first control switch Q1 can operate in a non-fully-conducting state based on the first control signal $V_{gs}$. The specific value of the first threshold can be set based on the operating principle of the first control switch Q1, which is not limited to the present invention.

Based on the above description, the present invention introduces a current loop into the buffer circuit 30, generates the first control signal $V_{gs}$ based on the loop current $I_{in}$, and at the same time restrains the loop current $I_{in}$ through the first control switch Q1 based on the first control signal $V_{gs}$, which realizes the closed-loop and feedback control of the loop current $I_{in}$ in the input loop, thereby enabling the buffer circuit 30 to buffer the loop current $I_{in}$ more accurately and effectively, enhancing the stability of the system and the anti-interference ability against uncertain factors in the buffering process, and improving the control accuracy and the buffering effect.

Moreover, the feedback control module 31 further includes a voltage detection unit 311. The voltage detection unit 311 is connected to the rectified input loop to obtain the input voltage in the rectified input loop, that is, the bus voltage (referred to as $V_{BUS}$) in the input loop, and is used to generate a second control signal (referred to as CP) based on the input voltage $V_{BUS}$ and the second threshold. The second control signal CP is used to adjust the voltage value of the reference signal $V_{ref}$ provided by the reference signal generating unit 312. The voltage detection unit 311 enables the voltage value of the reference signal $V_{ref}$ provided by the reference signal generating unit 312 to dynamically change according to different operating states of the driver circuit and generates the first control signal $V_{gs}$ based on the dynamic reference signal $V_{ref}$ to drive the first control switch Q1. The first control switch Q1 can change the operating state timely and accurately to effectively restrain the current spike in the loop, which helps to enhance the effect of restraining the current change rate of the loop current.

In a possible embodiment of the present invention, when the voltage detection unit 311 detects that the input voltage $V_{BUS}$ is smaller than the second threshold, the reference signal generating unit 312 provides the reference signal $V_{ref}$ with the first voltage value based on the second control signal CP. When the voltage detection unit 311 detects that the input voltage $V_{BUS}$ is greater than the second threshold, the reference signal generating unit 312 provides the reference signal $V_{ref}$ with the second voltage value based on the second control signal CP. The first voltage value is smaller than the second voltage value. In this way, the reference signal $V_{ref}$ provided to the operational amplifier 313 is only converted between the first voltage value and the second voltage value according to the different operating states of the driver circuit to ensure that the first control switch Q1 can be in the fully-conducting state when the loop current $I_{in}$ is normal and in the non-fully-conducting state to restrain the loop current when the loop current $I_{in}$ spikes. Moreover, the degree of complexity of the design and the cost of the reference signal generating unit 312 are relatively low, and the circuit structure is relatively simple.

Figure 6:
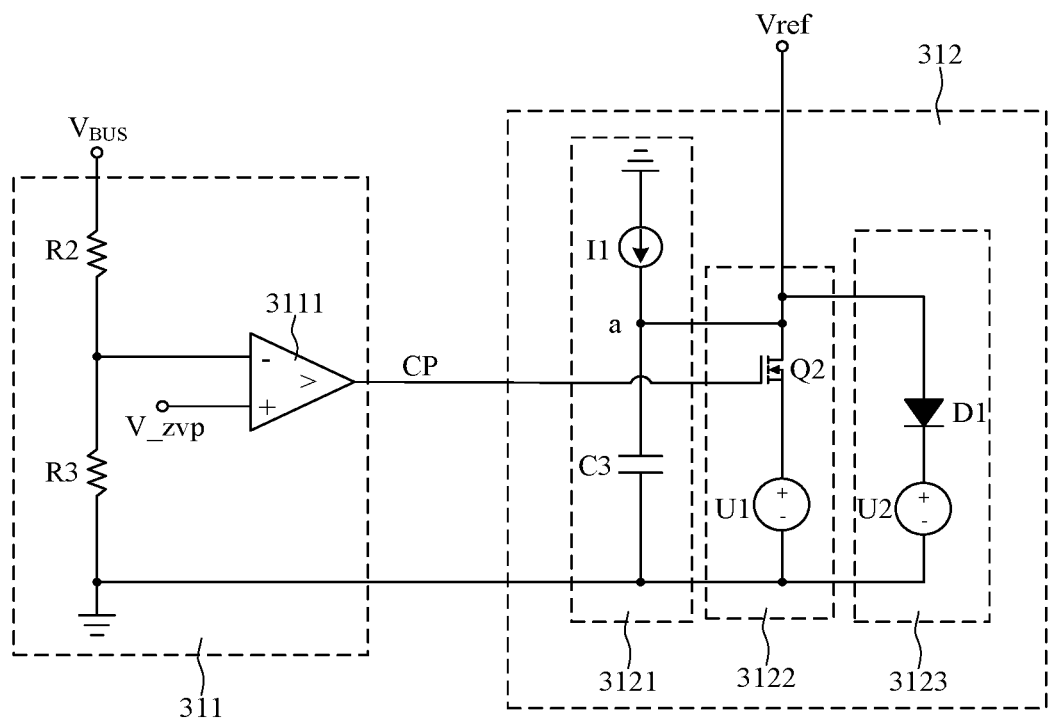
FIG. 6 shows a schematic structural diagram of a reference signal generating unit provided according to a first embodiment of the present invention.
Figure 7:
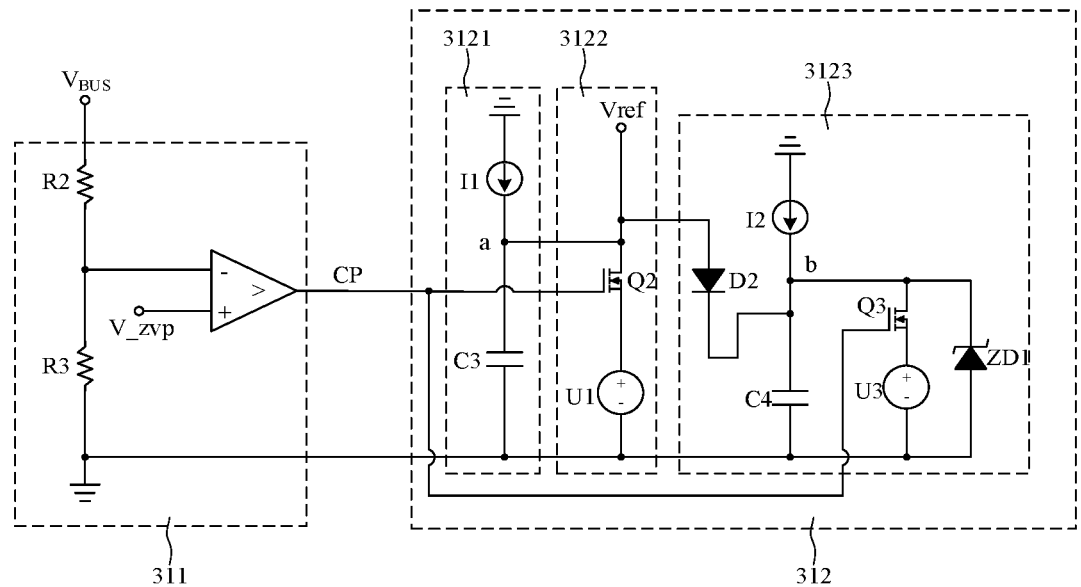
FIG. 7 shows a schematic structural diagram of a reference signal generating unit provided according to a second embodiment of the present invention.

Exemplarily, referring to FIG. 6 or FIG. 7, the voltage detection unit 311 includes a sampling unit and a comparator 3111. The sampling unit is connected to the rectified input loop and is used for sampling the input voltage $V_{BUS}$ in the input loop. The inverting input terminal of the comparator 3111 is connected to the sampling unit to receive the sampled input voltage, the non-inverting input terminal of the comparator 3111 receives the second threshold voltage V_zvp corresponding to the second threshold, and the output terminal of the comparator 3111 outputs the second control signal CP.

Optionally, the sampling unit is, for example, a resistance voltage dividing unit used to divide the input voltage $V_{BUS}$ before sampling and output it to the inverting input terminal of the comparator 3111. When the sampling unit is a resistance voltage dividing unit, it may include a resistor R2 and a resistor R3 connected in series between the two output terminals of the rectifier circuit 20, and the common connection point of the resistor R2 and the resistor R3 is connected to the inverting input terminal of the comparator 3111.

In this embodiment of the present invention, the reference signal generating unit 312 includes a base reference signal generating unit 3121, a first voltage adjusting unit 3122, and a second voltage adjusting unit 3123. The base reference signal generating unit 3121 is configured to generate the first base reference signal according to the first current source I1. The first voltage adjustment unit 3122 is configured to adjust the first base reference signal to the first voltage value when the second control signal CP is in a first level state, thereby realizing the output of the reference signal $V_{ref}$ having the first voltage value. The second voltage adjusting unit 3123 is configured to adjust the first base reference signal to the second voltage value when the second control signal CP is in a second level state, thereby realizing the output of the reference signal $V_{ref}$ having the second voltage value.

Exemplarily, referring to FIG. 6 or FIG. 7, the base reference signal generating unit 3121 includes the first current source I1 and a first capacitor C3 connected in series. The first current source I1 is used to provide a first charging current. The first end of the first capacitor C3 is connected to the first current source I1, and the second end of the first capacitor C3 is connected to the reference ground, which generates a first base reference voltage based on the first charging current at a first node a. The first node a corresponds to the common connection point of the first current source I1 and the first capacitor C3.

The first voltage adjustment unit 3122 includes a second control switch Q2 and a first voltage source U1. The drain of the second control switch Q2 is connected to the first node a, and the gate of the second control switch Q2 receives the second control signal CP. The positive voltage terminal of the first voltage source U1 is connected to the source of the second control switch Q2, and the negative voltage terminal of the first voltage source U1 is connected to the reference ground.

In a possible embodiment of the present invention, as shown in FIG. 6, the second voltage adjustment unit 3123 includes a first diode D1 and a second voltage source U2. The anode of the first diode D1 is connected to the first node a. The positive voltage terminal of the second voltage source U2 is connected to the cathode of the first diode D1, and the negative voltage terminal of the second voltage source U2 is connected to the reference ground.

In another possible embodiment of the present invention, as shown in FIG. 7, the second voltage adjustment unit 3123 includes a second diode D2, a second current source I2, a second capacitor C4, a third control switch Q3, a third voltage sources U3, and a Zener diode ZD1. The anode of the second diode D2 is connected to the first node a, and the cathode of the second diode D2 is connected to a second node b. The second current source I2 is used to provide a second charging current. The first terminal of the second capacitor C4 is connected to the second current source I2, and the second terminal of the second capacitor C4 is connected to the reference ground for generating a second base reference voltage at the second node b according to the second charging current. The common connection point of the second current source I2 and the second capacitor C4 is connected to the second node b. The drain of the third control switch Q3 is connected to the second node b, and the gate of the third control switch Q3 receives the second control signal CP. The positive voltage terminal of the third voltage source U3 is connected to the source of the third control switch Q3, and the negative voltage terminal of the third voltage source U3 is connected to the reference ground. The cathode of the Zener diode ZD1 is connected to the second node b, and the anode of the Zener diode ZD1 is connected to the reference ground.

Figure 8:
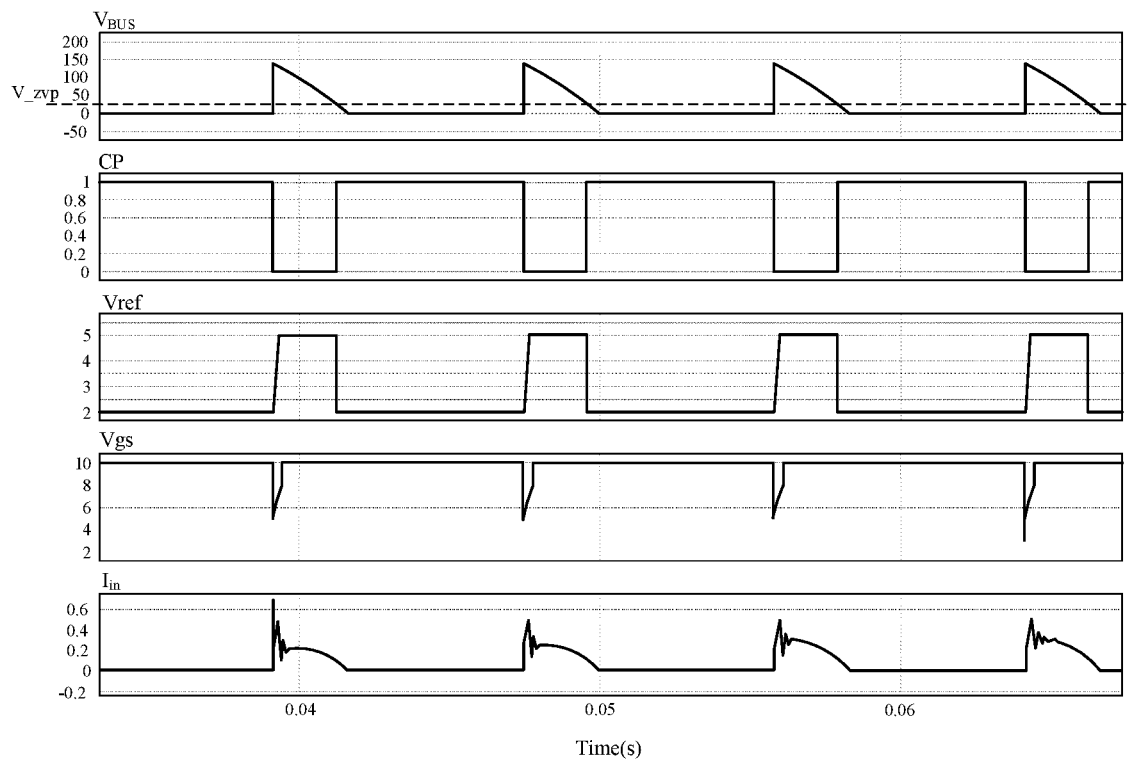
FIG. 8 shows a schematic diagram of a simulation result of a buffer circuit in the LED driver circuit according to FIG. 3.

Referring to FIG. 8, according to the operating principle of the LED driver circuit, a sawtooth waveform of the input voltage $V_{BUS}$ in each cycle corresponds to a voltage waveform of a sinusoidal alternating current in one cycle after being chopped by the Triac dimmer 10 and rectified by the rectifier circuit 20.

In each cycle, when the voltage detection unit 311 detects that the voltage value of the input voltage $V_{BUS}$ is smaller than the second threshold voltage V_zvp, it outputs a high-level second control signal CP. The high-level second control signal CP can trigger the first base reference signal generated at the first node a to discharge through the first voltage adjustment unit 3122, and after the discharge is completed, a reference signal $V_{ref}$ with a first voltage value is generated and output to the non-inverting input terminal of the operational amplifier 313. At this time, since there is no current spike and/or oscillation in the input loop, based on the difference between the reference signal $V_{ref}$ having the first voltage value at this time and the sampling signal of the loop current $I_{in}$ obtained by sampling through the sampling resistor R1, the operational amplifier 313 can generate the first control signal $V_{gs}$ that controls the first control switch Q1 to operate in the fully-conducting state, thereby enabling the LED driver circuit to operate normally.

In each cycle, when the voltage detection unit 311 detects that the voltage value of the input voltage $V_{BUS}$ is greater than the second threshold voltage V_zvp, it outputs a low-level second control signal CP. The low-level second control signal CP can trigger the first base reference signal generated at the first node a to discharge through the second voltage adjustment unit 3123, and after the discharge is completed, a reference signal $V_{ref}$ with a second voltage value is generated and output to the non-inverting input terminal of the operational amplifier 313. At this time, due to current spikes and/or oscillations occurring in the input loop, based on the difference between the reference signal $V_{ref}$ having the second voltage value at this time and the sampling signal of the loop current $I_{in}$ obtained by sampling through the sampling resistor R1, the operational amplifier 313 generates the first control signal $V_{gs}$ that controls the first control switch Q1 to operate in the non-fully-conducting state, thereby realizing the restraint of the loop current $I_{in}$.

In the present invention, based on the voltage detection unit 311, the voltage value of the reference voltage $V_{ref}$ can be converted from the first voltage value to the second voltage value at the beginning of a change period of the critical input voltage $V_{BUS}$ and restored to the first voltage value at the end of the change period of the critical input voltage $V_{BUS}$. This configuration enables effective restraint of the loop current $I_{in}$ regardless of when the spike of the loop current $I_{in}$ occurs in each change cycle of the input voltage $V_{BUS}$, and at the same time, and the control switch Q1 is prevented from being completely turned off, further avoiding the abnormal operation of the LED driver circuit.

It can be understood that, in the present invention, the base reference signal is generated by charging the capacitor with a current source, and the voltage value of the reference signal is adjusted by controlling the discharge amount of the base reference signal. This process is based on the characteristic of a voltage across two ends of a capacitor incapable of being suddenly changed, that is, the voltage across the two ends of the capacitor has a voltage gradual change process during the charging or discharging process. Correspondingly, there exists a voltage gradual change process of the reference signal $V_{ref}$ output to the operational amplifier 313 when changing from the first voltage value to the second voltage value. At the same time, since the loop current $I_{in}$ changes gradually during the restraint process of the loop current $I_{in}$, the control of the conducting degree of the first control switch Q1 in the non-fully-conducting state can be enhanced based on the voltage gradual change process of the reference signal $V_{ref}$, thereby enabling the conducting degree of the first control switch Q1 in the non-fully-conducting state to adjust according to the change of the loop current $I_{in}$, which improves the restraining effect on the loop current $I_{in}$.

In addition, in other embodiments of the present invention, other reasonable ways may also be used to adjust the voltage value of the reference signal $V_{ref}$ output to the operational amplifier 313 according to the second control signal CP. For example, a first linear power source capable of generating a first voltage value and a second linear power source capable of generating a second voltage value can be implemented, and the second control signal CP controls the first linear power source and the second linear power source in a time-sharing manner.

Figure 4:
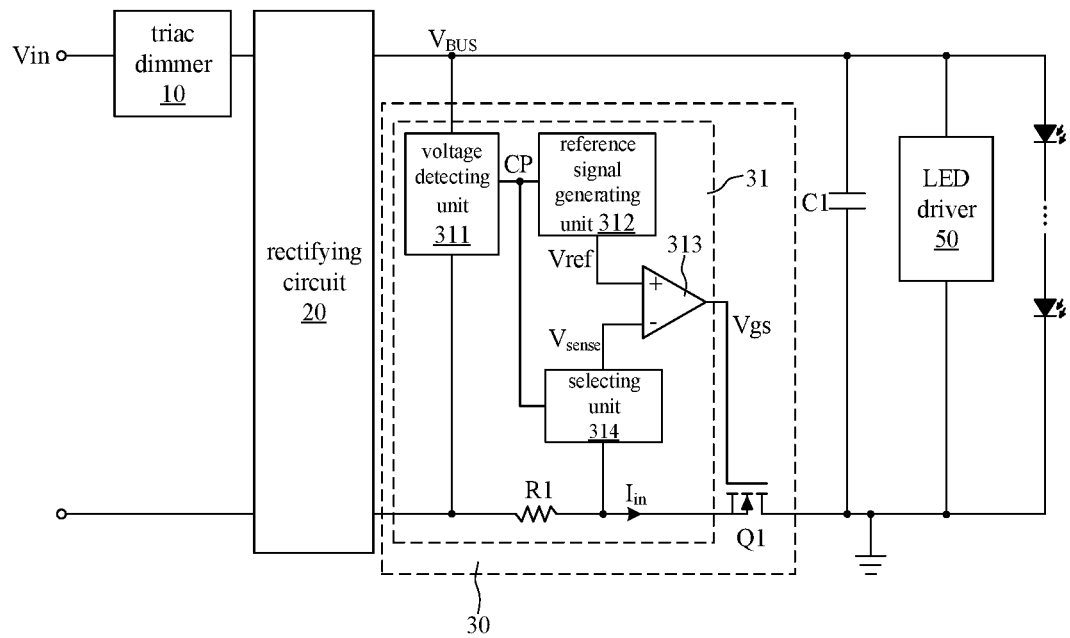
FIG. 4 shows a schematic structural diagram of another LED driver circuit provided according to an embodiment of the present invention.

Referring to FIG. 4, the present invention also provides another LED driver circuit. The circuit structure of the LED driver circuit shown in FIG. 4 is basically the same as the circuit structure of the LED driver circuit shown in FIG. 3, and the descriptions of the same circuit structure will not be repeated here. The difference between FIG. 3 and FIG. 4 is that: in the LED driver circuit shown in FIG. 4, before acquiring the loop current $I_{in}$, the feedback control module 31 acquires a reference voltage and generates a third control signal to the first control switch Q1 according to the reference voltage and the reference signal $V_{ref}$. The voltage value of the reference voltage is greater than the first voltage value, and the first control switch Q1 is in a completely off state after receiving the third control signal.

Specifically, the feedback control module 31 in the LED driver circuit shown in FIG. 4 further includes a selection unit 314. The selection unit 314 is connected to the voltage detection unit 311 to receive the second control signal CP and controls the inverting input terminal of the operational amplifier 313 to receive one of the loop current $I_{in}$ or the reference voltage according to the second control signal CP. When the input voltage $V_{BUS}$ of the rectified input loop is less than the second threshold, the inverting input terminal of the operational amplifier 313 receives the reference voltage. When the input voltage $V_{BUS}$ of the rectified input loop is greater than the second threshold, the inverting input terminal of the operational amplifier 313 receives the loop current $I_{in}$.

Figure 9:
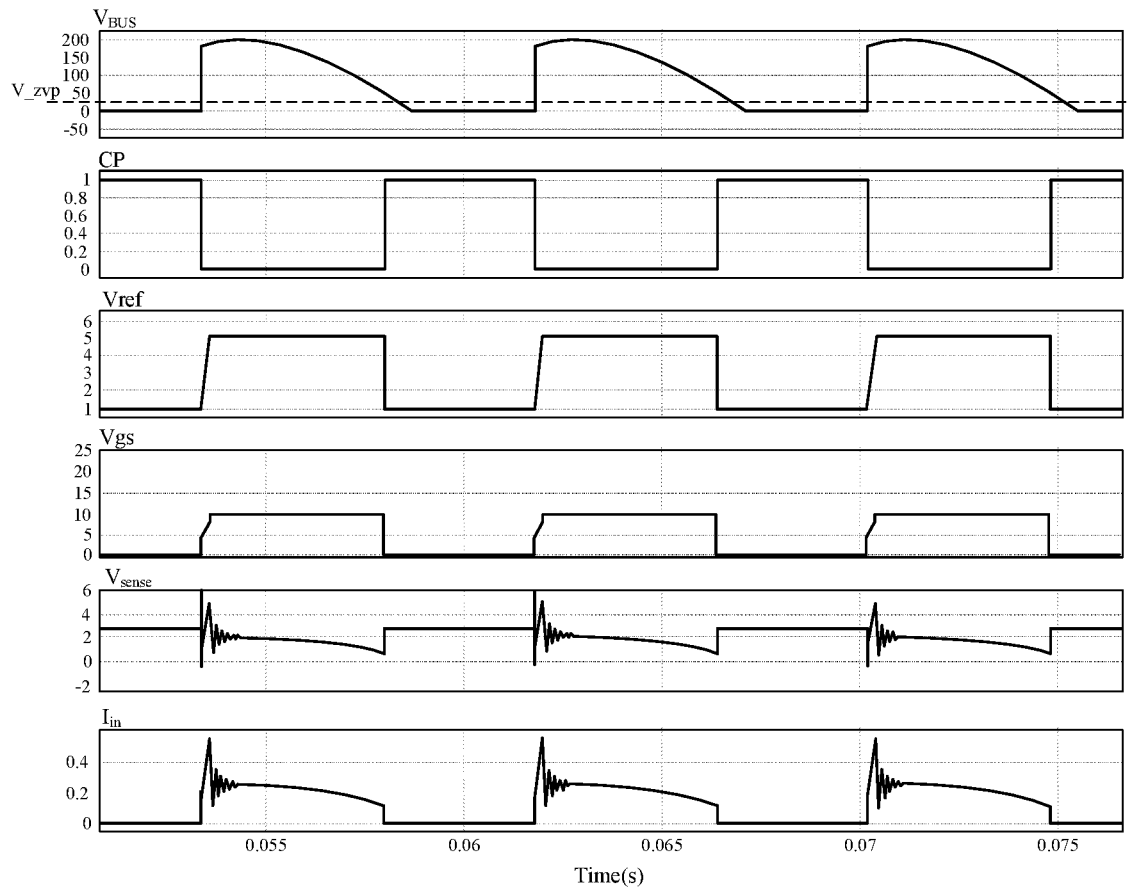
FIG. 9 shows a schematic diagram of a simulation result of a buffer circuit in the LED driver circuit according to FIG. 4.

Referring to FIG. 9, at the initial rise time of the half-wave voltage of the LED driver circuit shown in FIG. 4, when the input voltage $V_{BUS}$ of the input loop has not reached the second threshold voltage V_zvp corresponding to the second threshold, the second control signal CP is at a high level, and at this time, the voltage generated by the sampling resistor R1 in the input loop based on the loop current $I_{in}$ is essentially 0. At this time, the selection unit 314 selects a reference voltage with a voltage value greater than the first voltage value as the sampling voltage $V_{sense}$ and supplies it to the inverting input terminal of the operational amplifier 313 based on the second control signal CP at the high level, instead of supplying the sampling voltage $V_{sense}$ generated based on the loop current $I_{in}$ to the inverting input terminal of the operational amplifier 313, so that the first control switch Q1 is completely turned off before the input voltage $V_{BUS}$ of the input loop reaches the second threshold voltage V_zvp corresponding to the second threshold. Therefore, when the buffer circuit 30 buffers the current of the loop circuit of the LED driver circuit, the delay problem of the initial voltage rise in practical applications is fully considered and the reliability is higher and the buffer effect is enhanced. After that, when the input voltage $V_{BUS}$ of the input loop reaches the second threshold voltage V_zvp corresponding to the second threshold, the second control signal CP changes to a low level, and the selection unit 314 selects and supplies the sampling voltage $V_{sense}$ generated based on the loop current $I_{in}$ to the inverting input terminal of the operational amplifier 313 based on the second control signal CP at the low level, so that the first control switch Q1 enters the non-fully-conducting state to implement the buffer function until it enters the fully-conducting state.

In this embodiment, the selection unit 314 includes a selection switch. The first input terminal of the selection switch receives the reference voltage, and the second input terminal of the selection switch receives the loop current $I_{in}$. The output terminal of the selection switch is connected to the inverting input terminal of the operational amplifier 313, and the control terminal of the selection switch receives the second control signal CP. The selection switch selects one of its first input terminal or its second input terminal to be connected to its output terminal according to the second control signal CP. When the second control signal CP is at a high level, the selection switch connects its first input terminal to its output terminal and transmits the reference voltage to the inverting input terminal of the operational amplifier 313. When the second control signal CP is at a low level, the selection switch connects its second input terminal to its output terminal and transmits the loop current $I_{in}$ to the inverting input terminal of the operational amplifier 313.

Figure 5:
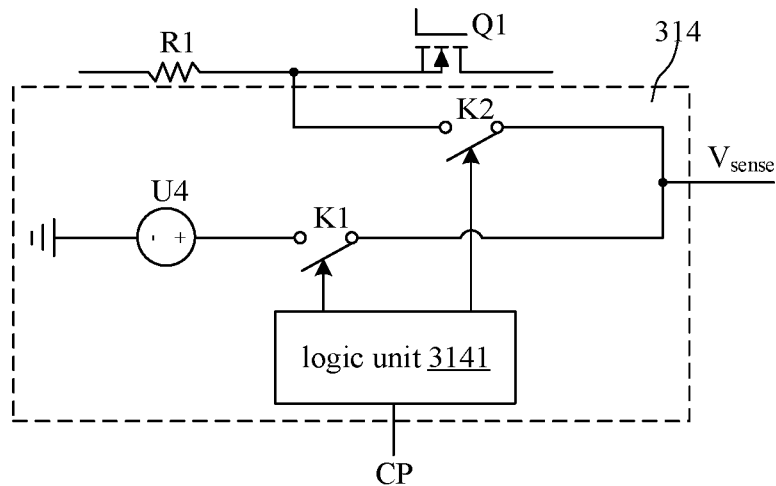
FIG. 5 shows the schematic structural diagram of the selection unit in FIG. 4.

Exemplarily, the aforementioned selection switch is a two-to-one selection switch. As shown in FIG. 5, the aforementioned selection switch includes a first switch K1 and a second switch K2. The first terminal of the first switch K1 receives the reference voltage, and the second terminal of the first switch K1 is connected to the inverting input terminal of the operational amplifier 313. The first terminal of the second switch K2 receives the loop current $I_{in}$, and the second terminal of the second switch K2 is connected to the inverting input terminal of the operational amplifier 313. The control signals of the first switch K1 and the second switch K2 are respectively provided by the logic unit 3141 based on the second control signal CP. For example, the reference voltage is provided by the fourth voltage source U4.

Of course, the selection unit 314 in the present invention is not limited to the foregoing exemplary structure, and in other embodiments of the present invention, the selection unit 314 may also have other practical structures, as long as the foregoing corresponding functions can be implemented.

Figure 10:
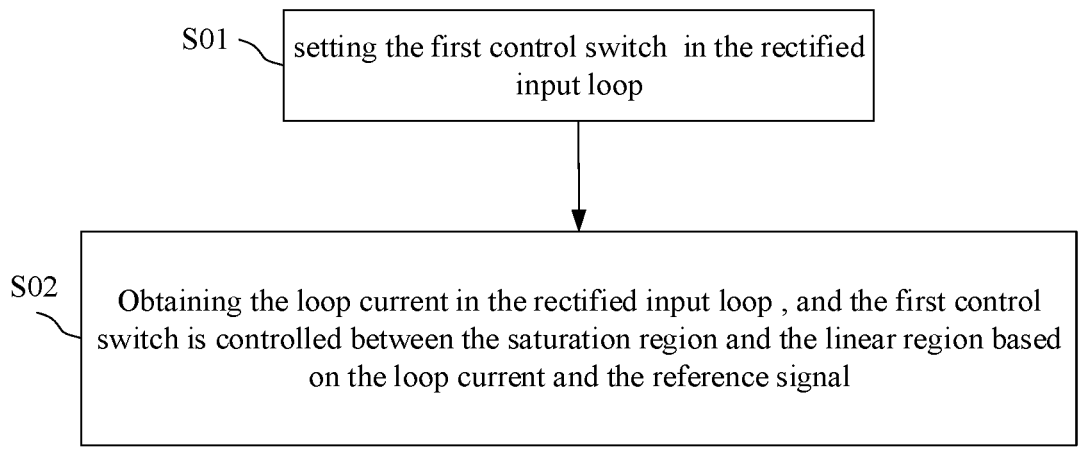
FIG. 10 shows a schematic flowchart of a control method for an LED driver circuit provided according to an embodiment of the present invention.

Furthermore, the present invention also provides a control method for a LED driver circuit, and the control method can be applied to the LED driver circuit shown in FIG. 3 to FIG. 9. Referring to FIG. 10, the control method includes performing the following steps:

In step S01, a first control switch is set in the rectified input loop.

In this embodiment, the first control switch is connected in series in the input loop of the LED driver circuit as shown in FIG. 3.

In step S02, the loop current in the rectified input loop is sampled and obtained, and based on the loop current and the reference signal, the first control switch is controlled to switch between a fully-conducting state and a non-fully-conducting state.

In this embodiment, the feedback control module 31 is connected with the rectified input loop to obtain the loop current $I_{in}$ in the rectified input loop and generate the first control signal $V_{gs}$ according to the obtained loop current $I_{in}$ and the reference signal $V_{ref}$, so that the first control signal $V_{gs}$ controls the first control switch Q1 to switch between the fully-conducting state and the non-fully-conducting state. When the difference between the reference signal $V_{ref}$ and the sampling signal obtained based on the loop current I is greater than the first threshold, the first control switch Q1 operates in the fully-conducting state based on the first control signal $V_{gs}$. At this time, the first control switch Q1 is fully conducting and enables the driver circuit to operate normally. When the difference between the reference signal $V_{ref}$ and the sampling signal obtained based on the loop current $I_{in}$ is less than the first threshold, the first control switch Q1 operates in the non-fully-conducting state based on the first control signal $V_{gs}$. At this time the first control switch Q1 is only partially conducting, so that the resistance characteristic of the first control switch Q1 in the non-fully-conducting state can be used to implement the buffer function to restrain the loop current $I_{in}$. The specific control method can be understood from the foregoing description of FIG. 3, and the details will not be repeated here.

Furthermore, the control method further includes controlling the first control switch Q1 to be in a completely turned-off state before the first control switch Q1 is controlled to be in the non-fully-conducting state. The details may refer to the foregoing descriptions of FIG. 4 and FIG. 5 for understanding, which will not be repeated here.

Moreover, the control method further includes acquiring the input voltage in the rectified input loop and adjusting the voltage value of the reference signal according to the input voltage and the second threshold. When the input voltage is less than the second threshold, the reference signal is adjusted to a first voltage value. When the input voltage is greater than the second threshold, the reference signal is adjusted to a second voltage value. The first voltage value is less than the second voltage value. The details may refer to the foregoing descriptions of FIG. 6 and FIG. 7 for understanding, which will not be repeated here.

In summary, the present invention introduces a current loop into a buffer circuit, realizes a closed-loop control of the loop current in the input loop, and has an enhanced buffer effect. Further, the buffer circuit provided by the present invention has a simple circuit structure and only uses the resistance characteristic of a control switch in a non-fully-conducting state to realize a buffering function without implementing a buffer resistor, which avoids the risk that the buffer resistor can be easily damaged when the circuit operates abnormally, thereby resulting in higher safety and reliability. Furthermore, the feedback control module is based on a dynamic voltage value of the reference signal capable of changing according to the different operating states of the circuit, which helps to ensure that the control switch in the input loop can be fully conducting when the loop current is normal and only partially conducting to effectively restrain the loop current from spiking when the loop current spikes occur, thereby enhancing the restrain effect on the current change rate (di/dt) of the loop current.

Finally, it should be noted that: obviously, the above-mentioned embodiments are only examples for clearly illustrating the present invention and are not intended to limit the implementation manner. For those of ordinary skill in the art, changes or modifications in other different forms can also be made based on the above description. It is impractical to be exhaustive of all implementations here. Any obvious changes or modifications derived from this are still within the protection scope of the present invention.

The invention claimed is:

1. A buffer circuit for an LED driver circuit, comprising:
   a first control switch connected in series in a rectified input loop, and
   a feedback control module connected to the rectified input loop to obtain a loop current in the rectified input loop for generating a first control signal to the first control switch according to the loop current and a reference signal,
   wherein the first control switch switches between a fully conducting state and a non-fully-conducting state based on the first control signal and restrains the loop current when the first control switch is in the non-fully-conducting state,
   wherein the first control switch operates in the fully conducting state when a difference between the reference signal and a sampled signal obtained from the loop current is greater than a first threshold,
   wherein the first control switch operates in the non-fully-conducting state when the difference between the reference signal and the sampled signal obtained from the loop current is smaller than the first threshold, and
   wherein the feedback control module comprises:
      a sampling resistor connected in series with the first control switch in the rectified input loop;
      an operational amplifier wherein an inverting input terminal is connected to a common connection point of the sampling resistor and the first control switch to sample the loop current, a non-inverting input terminal receives the reference signal, and an output terminal is connected to a control end of the first control switch to output the first control signal; and
      a reference signal generating unit connected to the inverting input terminal of the operational amplifier for providing the reference signal.

2. The buffer circuit according to claim 1, wherein the feedback control module further comprises:
   a voltage detection unit connected to the rectified input loop to acquire an input voltage in the rectified input loop for generating a second control signal according to the input voltage and a second threshold, wherein the second control signal is configured for adjusting a voltage value of the reference signal provided by the reference signal generating unit.

3. The buffer circuit according to claim 2, wherein, when the input voltage of the rectified input loop is smaller than the second threshold, the reference signal generating unit provides the reference signal having a first voltage value based on the second control signal;
   when the input voltage of the rectified input loop is greater than the second threshold, the reference signal generating unit provides the reference signal having a second voltage value based on the second control signal,
   wherein the first voltage value is smaller than the second voltage value.

4. The buffer circuit according to claim 3, wherein before obtaining the loop current, the feedback control module is further configured to obtain a reference voltage and generate a third control signal to the first control switch based on the reference voltage and the reference signal, and
   wherein the reference voltage is greater than the first voltage value and the first control switch is in a completely off state after receiving the third control signal.

5. The buffer circuit according to claim 4, wherein the feedback control module further comprises:
   a selection unit connected to the voltage detection unit to receive the second control signal, wherein the selection unit is configured to control the inverting input terminal of the operational amplifier to receive one of the reference voltage or the loop current according to the second control signal.

6. The buffer circuit according to claim 5, wherein when the input voltage of the rectified input loop is less than the second threshold, the inverting input terminal of the operational amplifier receives the reference voltage;
   when the input voltage of the rectified input loop is greater than the second threshold, the inverting input terminal of the operational amplifier receives the loop current.

7. The buffer circuit according to claim 6, wherein the selection unit comprises:
   a selection switch, wherein a first input terminal receives the reference voltage, a second input terminal receives the loop current, an output terminal is connected to the inverting input terminal of the operational amplifier, and a control terminal receives the second control signal,
   the selection switch selects one of the first input terminal or the second input terminal to communicate with the output terminal according to the second control signal.

8. The buffer circuit according to claim 7, wherein the voltage detection unit comprises:
   a sampling unit connected to the rectified input loop for sampling the input voltage, and
   a comparator, wherein an inverting input terminal is connected to the sampling unit to receive a sampled input voltage, a non-inverting input terminal receives a second threshold voltage, and an output terminal of the comparator outputs the second control signal.

9. The buffer circuit according to claim 8, wherein the reference signal generating unit comprises:
a base reference signal generating unit configured to generate a first base reference signal according to a first current source;
a first voltage adjustment unit configured to adjust the first base reference signal to the first voltage value when the second control signal is in a first level state; and
a second voltage adjustment unit configured to adjust the first base reference signal to the second voltage value when the second control signal is in a second level state.

10. The buffer circuit according to claim 9, wherein the base reference signal generating unit comprises:
the first current source for providing a first charging current, and
a first capacitor connected to the first current source for generating a first base reference voltage at a first node according to the first charging current,
wherein the first node is a common connection point between the first current source and the first capacitor.

11. The buffer circuit according to claim 10, wherein the first voltage adjustment unit comprises:
A second control switch comprising a drain connected to the first node and a gate receiving the second control signal, and
a first voltage source comprising a positive voltage terminal connected to a source of the second control switch and a negative voltage terminal connected to a reference ground.

12. The buffer circuit according to claim 11, wherein the second voltage adjustment unit comprises:
a second diode comprising an anode connected to the first node and a cathode connected to a second node;
a second current source for providing a second charging current,
a second capacitor connected to the second current source and configured to generate a second base reference voltage at the second node according to the second charging current, wherein a common connection point of the second current source and the second capacitor is connected to the second node;
a third control switch comprising a drain connected to the second node and a gate receiving the second control signal;
a third voltage source comprising a positive voltage terminal connected to a source of the third control switch and a negative voltage terminal connected to the reference ground; and
a Zener diode including a cathode connected to the second node and an anode connected to the reference ground.

13. The buffer circuit according to claim 11, wherein the second voltage adjustment unit comprises:

a first diode including an anode connected to the first node, and
a second voltage source including a positive voltage terminal connected to a cathode of the first diode and a negative voltage terminal connected to the reference ground.

14. A LED driver circuit, comprising: a Triac dimmer, a rectifier circuit, a filter circuit, and an LED driver, wherein the rectifier circuit, the filter circuit, and the LED driver are connected in parallel to form an input loop, and the Triac dimmer is connected in series in an input terminal of the input loop;
wherein the LED driver circuit further comprises: the buffer circuit for the LED driver circuit according to claim 1, and the buffer circuit is connected in series in the input loop.

15. The LED driver circuit according to claim 14, wherein the first control switch operates in the fully conducting state when a difference between the reference signal and a sampled signal obtained from the loop current is greater than a first threshold, and
wherein the first control switch operates in the non-fully-conducting state when the difference between the reference signal and the sampled signal obtained from the loop current is smaller than the first threshold.

16. A control method for an LED driver circuit, comprising:
setting a first control switch in a rectified input loop;
sampling and acquiring a loop current in the rectified input loop;
controlling the first control switch to switch between a fully conducting state and a non-fully-conducting state based on the loop current and a reference signal, wherein when it is detected that a difference between the reference signal and a sampled signal obtained from the loop current is smaller than a first threshold, the first control switch operates in the non-fully-conducting state to restrain the loop current;
obtaining an input voltage in the rectified input loop; and
adjusting a voltage value of the reference signal according to the input voltage and a second threshold,
wherein when the input voltage is less than the second threshold, adjusting the reference signal to a first voltage value, and
when the input voltage is greater than the second threshold, the reference signal is adjusted to a second voltage value, and the first voltage value is smaller than the second voltage value.

17. The control method according to claim 16, wherein the control method further comprises: before the first control switch is controlled to operate in the non-fully-conducting state, the first control switch is in a fully-off state.

* * * * *